United States Patent Office 2,852,833
Patented Sept. 23, 1958

2,852,833

METHOD OF IMPROVING FLAT GOODS

Hermann Georg Mueller, Herisau, Switzerland, assignor to Aktiengesellschaft Cilander, Herisau, Switzerland No Drawing. Application May 11, 1953
Serial No. 354,422

Claims priority, application Switzerland May 13, 1952

18 Claims. (Cl. 26—69)

This invention relates to flat material, i. e. fabrics, film, plastics etc. and more particularly to the improvement of flat material comprising synthetic thermoplastic materials.

The patterned deformation, or pattern embossing, of flat material comprising synthetic thermoplastic materials, heretofore has met with the drawback that with this kind of improvement, only very weak optical contrast effects could be obtained. The deformation without pattern, i. e. the production of a high glaze effect only, of synthetic thermoplastic flat material was bound to depend solely on the type of glaze obtainable by the mechanical deformation proper and which, for a given kind of flat material or fabrics, is always the same. Thus it was not possible up to now to produce simultaneously with such deformations, desirable farther reaching modifications in the appearance of the textile material, particularly with respect to glaze or matting effects, for the purposes of permanently increasing the contrast between the deformed and the unaltered parts of the fabric, or of achieving, particularly with flat material deformed without pattern, a variety of glazes of distinct appearance.

It is an object of the present invention to overcome these drawbacks, and to provide methods of improving flat material comprising synthetic thermoplastic materials wherein the deformation is accompanied by the production of material optical contrast effects.

It is a further object of this invention to provide methods of improving flat material comprising synthetic thermoplastic materials wherein a pattern-forming mechanical deformation, is accompanied by the production of material contrast effects, such as glaze and/or matting.

Still another object of this invention is to provide methods of improving flat material comprising synthetic thermoplastic materials wherein a patternless deformation is accompanied by the production of one of a variety of glazes of distinct appearance, the glazes being susceptible to variation even though the textile material remains the same.

The invention further aims at the production of flat material partly or totally composed of synthetic thermoplastic materials and displaying novel contrast effects not heretofore obtainable with flat material of this kind.

Other objects, and the manner in which they are attained, will become apparent as this specification proceeds.

Particularly considering the fact that the elimination of the above-noted drawbacks, and the production of pronounced and variable contrast effects on one and the same material, have been a great desideratum in this art, it was surprising to discover, in the course of the work culminating in the present invention, that these valuable effects can be obtained provided the reflection of light from at least a part of the textile material, is modified at any stage of the improvement thereof, i. e. before and/or after the mechanical deformation with solid, liquid or gaseous agents adapted to influence the surface of the synthetic thermoplastic material. This mode of procedure, quite unexpectedly, dependent on the particular conditions of treatment employed, either results in a permanent matting of the unaltered portions of the material while at the same time, the deformed and patterned portion retains the mechanically imparted glaze, or else, if other conditions of treatment are used involving either the same or different matting agents, the inverse effect is obtained so the deformed and patterned part of the material is matted while the undeformed part retains its original optical characteristics. It was equally surprising and unexpected to find that the invention, particularly when applied in conjunction with non-patterned deformations such as calendering with smooth rollers, results in a wide variety of valuable, heretofore unknown, permanent optical effects on flat material comprising synthetic thermoplastic fibrous materials.

The invention contemplates as flat materials susceptible to treatment all those which contain synthetic thermoplastic materials either by themselves, or in mixture with other materials, and which my be present in the form of film, coatings or other stratified or laminated layers, plastics, fabrics, knit goods, or mixed weaved or spun goods. Synthetic thermoplastic materials embraced by the invention are exemplified by polyamides, polyacrylonitriles, polyvinyls, polyesters or mixed polymers. Flat material to be improved in accordance with the invention may enter the treatment in any state of pre-treatment or prior improvement, and thus may be subjected to the methods of the invention, for example, in the crude, bleached, fixed, or stabilized, unfixed, dyed, printed, or cold calendered states.

As the agents adapted to modify the reflection of light from the flat material, the invention contemplates all those agents which under the prevailing conditions of treatment, attack the synthetic thermoplastic material only surfacewise, i. e. particularly swelling agents and solvents for synthetic thermoplastic materials, such as, for example, sulfuric acid, hydrochloric acid, nitric acid, phosphoric acid, formic acid, phenols and cresols, and mixtures thereof.

These matting agents can be applied to the textile material in the form of solutions, or in the gaseous state, or in solid form, for example by impregnation, imprint of thickened matting solutions or of substances giving off matting agents, or by passage through vaporous or gaseous matting media.

When using the matting agent or agents in the form of solutions, the desired concentration is produced by a selection of suitable solvents, and diluents may be selected either from among completely inert solvents or those which result by themselves in a more or less pronounced increase in the action of the matting agent, or else influence the matting agent so it will have an increased effect.

Inert solvents contemplated include, for example, water, alcohol, acetone, benzene and other aromatic hydrocarbons, their derivatives and homologues, further benzine and other saturated and unsaturated aliphatic hydrocarbons, and mixtures thereof.

As solvents or additives influencing in some manner the action of the matting agent, the invention contemplates, for example, acetic acid, oxalic acid, lactic acid, formamidine, acetophenons, alkaline solutions of phenols, especially parabutylphenol, cresols, xylenols, their substitution products, homologues or derivatives, further glycol compounds, particularly diethylene glycol, further benzyl alcohol, pyrogallol, thymol, further substances giving off matting agents such as aluminum chloride, persulfate, ammonium sulfate, ammonium chloride etc.

Also, substances may be added to the matting agent which primarily, reduce the stiffening or hardening influence of the matting agent on the flat material, such as glycol and compounds thereof, glycerin, alcohols, formaldehyde, for example.

The operating conditions under which such a matting agent is applied, vary with respect to concentration, temperature and duration of action, dependent on the kind of fibrous material treated and the effect desired. The effective ranges of these operating conditions are illustrated by the following table:

A. FOR POLYAMIDE FIBERS ("NYLON", "GRILON", "PERLON")

| Matting agent | Concentration | Temperature, °C. | Duration |
| --- | --- | --- | --- |
| $H_2SO_4$ | 20–60° Bé | −30 to +80 | 1 sec. to 2 min. |
| HCl | 8–18° Bé | −30 to +80 | Do. |
| $HNO_3$ | 18–30° Bé | −30 to +80 | Do. |
| HCOOH | 30–85% | −30 to +80 | Do. |
| Cresol in organic solvents (benzine) | 5–100% | 0 to 100 | 1 sec. to 5 min. |
| $H_3PO_4$ | 50–85% | −30 to +100 | 1 sec. to 10 min. |

B. FOR POLYACRYLONITRILE FIBERS ("ORLON")

| Matting agent | Concentration, °Bé. | Temperature, °C. | Duration |
| --- | --- | --- | --- |
| $H_2SO_4$ | 60–66 | +50 to +120 | 1 sec. to 5 min. |
| $HNO_3$ | 35–44 | −20 to +60 | Do. |

The modification of the light reflection from the flat material, and in particular from fabrics, can also be effected by passage of the textile material through a vapor or gas chamber containing a matting agent, or by spraying, blowing etc. of such matting vapors or gases on the goods to be improved, at elevated temperature if desired. Suitable vapors contemplated by the invention include also acid vapors such as nitric and hydrochloric acid vapors.

A further mode of application of the matting agents envisaged by the invention, involves printing with printing pastes containing a matting agent or substances splitting off a matting agent. The latter procedure may use aluminum chloride, phosphorus pentachloride and other halides splitting off acid readily, further ammonium sulfate, ammonium chloride, nitrate etc., to mention some specific examples. These matting agents are printed, if desired with an addition of such customary printing auxiliaries as thickeners, plasticisers etc., to be subsequently removed by washing after or without having been dried and/or heated previously.

The modification of the light reflection characteristics by means of the agents enumerated, or their action on the flat material can be influenced by treating the goods to be improved prior to the matting step, with swelling agents and/or solvents known to be suitable for the particular fiber or the synthetic thermoplastic material treated, so as to swell the same and/or start dissolution on the surface thereof, to a smaller or larger extent as desired, and this under such conditions (concentration, temperature, duration of exposure) that this pretreatment does not result as yet in a matting effect whereby with the subsequent matting treatment e. g. an increased or more uniform matting effect, or some particular hand may be obtained.

The mechanical deformation is effected by means of heated molding bodies (stamps, embossing dies etc.), and particularly with calendar rollers, e. g. smooth, patternless calendar rollers which when used with or without friction, yield high glaze finishes, further by means of hatched rollers which dependent on the size and arrangement of the hatching yield various predetermined glaze effects, of by means of smooth pattern-engraved rollers, or with embossing rollers with raised relief embossing patterns, the mechanical deformation being carried out at the optimum pressure determined for the particular material under treatment and the particular effect desired, and at a temperature at which the synthetic thermoplastic material is in a plastic or deformable state.

The terms "mechanical deformation" or "mechanical molding" are intended to refer to all those mechanical influences which modify the surface texture of the flat material in any way or manner relative to the original form thereof, and these deformation or molding steps include any such effects as glaze finish by friction, glaze finish by pressing, glaze finish by rolling pressure, glaze finish by embossing of fine, light refracting hatching, further embossings of any description which latter, in contrast to the glaze finish effects proper, may be three-dimensional, as well as other form changes such as compression or upsetting etc. The expressions "patterned deformations" or "pattern-embossing" are intended to refer to such form or shape affecting effects which are arranged in the plane of the fabric etc. in the form of a pattern, i. e. as a pattern with a contrast effect in the untreated parts of the surface. The patterned deformation proper can be plane, i. e. two-dimensional or may be provided in relief, i. e. three-dimensional.

This patterning of the deformation is obtained by the use of molding bodies engraved with a corresponding design, and particularly calendar rollers of the kind mentioned above, or else the pattern can be printed on thermoplastic textile material in the form of a heat insulating reserve which influences the heat transfer from the heated molding body to the thermoplastic material in such a manner that in the reserved portion no or at most a reduced thermoplastic deformation takes place. Reserves of this type most frequently contain as the agent with low heat conducting characteristics, a substance having a heat conductivity coefficient of less than 0.05 at a temperature of 30° C.

The methods of the present invention may use two or more of the deformation procedures referred to above, in any desired combination or sequence on one and the same flat material.

The methods according to the invention require no particular sequence of mechanical deformation and matting procedures. In fact, the modification of the light reflection characteristics of at least certain portions of the flat material by solid, liquid or gaseous agents may take place at any stage of the improving treatment, and more particularly prior as well as subsequently to the mechanical deformation. Dependent on the matting conditions (concentration, temperature and time of exposure), the conditions of the mechanical deformation (temperature, amount of pressure applied and duration of action of the molding body), and the type, structure and quality of the flat material to be improved, a difference in the sequence of matting and molding procedures causes different, and partly even opposite effects to be obtained. When only a single mechanical deformation procedure, and a single matting treatment only are employed, in the simplest case the following principal possible effects result:

I. *First the matting treatment, then the mechanical deformation*

(a) Unpatterned deformation (e. g. smooth high glaze calendering): yields a milky-white glaze.

(b) Patterned deformation (e. g. embossing calendering): yields a brilliant milky-white relief pattern on a mat-white background.

II. *First the mechanical deformation, then the matting treatment*

(a) Unpatterned deformation (e. g. smooth high glaze calendering): yields a smooth appearing, uniform matting effect.

(b) Patterned deformation (e. g. embossing calendering):
   (1) With intensive conditions of deformation (elevated temperature, elevated amount of pressure applied, and/or increased duration of action of the molding body) and using mild matting conditions, the deformed portions of the flat material are matted whereas the undeformed portions retain their original optical appearance aspects. In this connection, the matting treatment preferably should be carried out under conditions so selected that the undeformed goods under treatment just miss being matted. The effective ranges of these operating conditions vary dependent on the type, quality and structure of the flat material to be improved; this applies equally to the effective ranges of the conditions of the mechanical deformation.

(2) With mild conditions of mechanical deformation (lower temperature, reduced applied pressure, and/or shorter duration of action of the molding body) the undeformed portions of the flat material are matted in the subsequent matting treatment whereas the deformed portions retain the original glaze imparted to them in the course of deformation. The conditions used in this instance for the matting treatment, preferably go just beyond the limit where the same material, in the undeformed state, is just still matted.

In the cases of (1) and (2), the effective ranges of the conditions of deformation as well as of the matting conditions depend on the type, structure and quality of the flat material under treatment.

(3) If the matting treatment is carried out under relatively intensive conditions (higher concentration, elevated temperature, comparatively long reaction time), whatever the intensity of the conditions of deformation, the deformed as well as the undeformed portions of the flat material are matted, the respective matting effects on these portions differing from one another more or less dependent on the matting conditions employed.

The mechanical deformation can be made to act on the flat material consisting wholly or partly of thermoplastic material, by imparting thereto patterns standing out to varying degrees, with the result that portions more weakly deformed thermoplastically, and portions more strongly deformed thermoplastically are created side by side in pattern form so the matting treatment, whether applied prior or subsequently to the deformation, yields a patterning the light reflection characteristics of which differ not only from those of the undeformed portions, but moreover from those of the more strongly or more mildly deformed portions. Manifestly a great variety of differently graded matting or glaze effects in pattern form, can thus be obtained. A differential deformation of the kind just noted is obtained, for example, by the imprint of at least two heat insulating reserves the heat conductivities of which are markedly distinct, followed by hot calendering, or by multiple, and at least two mechanical deformation steps carried out under different conditions (temperature, applied pressure, duration of action of the molding body). The possibilities of variation, of course, can still be expanded in that one and the same flat material is subjected, in any sequence desired, to several deformation and matting operations.

Furthermore, very beautiful effects are created if at any stage of the improvement prior to the matting treatment, the goods under treatment are printed in pattern form with a printing paste acting as a reserve with respect to the matting agent, with the result that the agent for modifying the light reflection characteristics cannot attack the printed portions of the material. Reserves of this kind can be applied temporarily or fixed permanently on the flat material, i. e. they may be removed by washing or else may remain. Printing reserves useful for this purpose include, for example, gum arabic, British gum, tragacanth, starch and its derivatives, nitrocellulose and other cellulose derivatives, artificial resin-precondensate etc. These reserves, and especially those fixed permanently, may contain dyestuffs, pigments, metal powder, foils, fibers of all kinds etc.

The textile goods to be improved according to the invention can be bleached, fixed, dyed, printed, finished or otherwise improved in any known manner, at any stage of the improvement; thus very beautiful curled or creped effects are obtained if the embossed, patterned and matted textile material is treated with shrinking agents suitable for the particular kind of fibrous material under treatment. Shrinking agents suitable e. g. for polyamide and polyacrylonitrile fibers include: alkaline phenol and cresol solutions, acetic acid, sulfuric acid with or without an addition of oxidizing agent, hydrochloric acid, nitric acid etc.

The invention will be more fully described by reference to the following specific examples. It should be understood, however, that the examples are given by way of illustration only and that the invention is not to be limited by the details set forth therein.

EXAMPLE I

A dyed nylon-toile is pattern-embossed at 140° C., subjected to an acid treatment under the following conditions:

Sulfuric acid of 28.5° Bé. at 15° C. for 5 seconds and thereafter put through a hot rinse and washed well. After washing and drying, in the embossed places raised brilliant portions are obtained which have been attacked by the acid to an unnoticeable extent only and which stand out clearly from the mat background. At the same time a difference in color shades is created inasmuch as the non-deformed portions are markedly brightened by the matting treatment.

EXAMPLE II

An Orlon-toile is immersed, spread out, in an acid bath of:

Hydrochloric acid of 39° Bé. at 10° C. for 7 seconds well washed, dried, pattern-embossed at 135° C. and hereafter dyed or printed. In the embossed places the fabric is imparted a distinctive embossing glaze which stands out from the mat background.

EXAMPLE III

A nylon-muslin calendered at 140° C. is pattern-printed with a reserve consisting of:

200 g. of hexamethylene-tetramine
250 g. of water of 40° C.
200 g. of gum arabic 2:1 (2 parts gum arabic, 1 part water)
350 g. of starch-tragacanth (1 part starch, 9 parts tragacanth)

subjected to an acid treatment with:

Sulfuric acid of 29° Bé. at 10° C. for 5 seconds well rinsed, the reserve is removed by thorough washing and the material is dried. The reserved portions stand out owing to their calender glaze, from the mat background.

EXAMPLE IV

A nylon-percal is pattern-printed with the following printing composition:

900 g. of gum arabic 1:1 (1 part gum arabic, 1 part water)
90 g. of water
10 g. of turpentine, embossed at 155° C., acidified with:

Sulfuric acid of 29° Bé. at 15° C. for 5 seconds, rinsed and after removal of the reserve by thorough washing, dried. This treatment yields a four-tone effect distinguishing from one another the following four kinds of portions:

(1) Matted, undeformed portions
(2) Matted, deformed portions
(3) Unmatted, undeformed portions
(4) Unmatted, deformed portions.

In the deformed portions the matting is more pronounced than in the undeformed portions.

EXAMPLE V

A nylon-muslin is pattern-printed with a printing composition acting as a reserve with respect to the matting agent and composed as follows:

50 g. of urea
100 g. of gum arabic (2 parts gum arabic, 1 part water)
250 g. of starch-tragacanth (1 part starch, 9 parts tragacanth)

subjected to an acid treatment with:

Sulfuric acid at 28.5° Bé. at 0° C. for 7 seconds, rinsed and after removal of the reserve by washing, dried. Thereafter, the material is embossed with a hatched roller at 135° C. This embossing yields pattern-wise differentiated glaze effects in the matted as well as in the unaltered portions of the fabric. These effects can still be enhanced by subsequent dyeing.

EXAMPLE VI

A dyed nylon-toile is pattern-printed with an acid-resistant reserve consisting of 100 g. of cellulose glycollic acid sodium
900 g. of water at 40° C.

subjected to an acid treatment with:

Sulfuric acid at 29.5° Bé.+2 vol. percent of glycerin at 10° C. for 5 seconds, rinsed and after removal of the reserve by washing, dried and calendered at 160° C.

This treatment results in the matted portions in a lardaceous glaze similar to that of cotton chintz, which contrasts in an extraordinary manner with the usual calender glaze of the unmatted portions.

EXAMPLE VII

A fixed fabric of caprolactam fibers is treated with formic acid of 40 percent concentration at 18° C. for 1 minute, well rinsed, dried, thereupon subjected to a matting acid treatment under the following conditions:

Hydrochloric acid of 10° Bé. at 10° C. for 5 seconds, well rinsed, dried, dyed or printed and thereafter calendered at 160° C.

A lardaceous glaze of milky appearance is obtained.

EXAMPLE VIII

A fixed, bleached nylon-percal is printed by means of a pattern-engraved printing roller, with a printing composition having a reserve action with respect to acid treatment, and consisting of:

720 g. of crystal gum solution (2 parts crystal gum, 3 parts water)
280 g. of water (cold), pattern-embossed at 160° C. and thereafter subjected to a mild acid treatment having an opaque effect, with Sulfuric acid of 29° Bé. at 5° C. for 7 seconds, and after removal of the reserve by washing with acetic acid of 10 percent concentration at 50° C., rinsed and dried.

This treatment results in a three-tone effect. The embossed portions are imparted a more pronounced white effect, the untreated portions are mildly matted, whereas the reserve printed portions retain the original glaze.

EXAMPLE IX

A fixed, bleached nylon fabric is pattern-printed with the following permanent printing composition:

160 g. of acetyl-cellulose
480 g. of acetone
180 g. of glycol-monoacetate
180 g. of diaceton-alcohol thereafter subjected to a matting acid treatment with Sulfuric acid at 28.5° Bé.+10% of acetic acid of 80 percent concentration at 10° C. for 5 seconds, well rinsed and dried; hereafter follows calendering at 115° C.

This treatment imparts to the printed, unmatted portions a calender glaze, whereas the matted portions of the material are only mildly modified by the calendering procedure at the low temperature employed.

EXAMPLE X

A nylon-toile is printed in pattern form with a printing paste acting as reserve against acid and at the same time, being heat-insulating and composed as follows:

50 g. of hexamethylene tetramine
600 g. of water of 40° C.
100 g. of gum arabic (2 parts gum arabic, 1 part water)
250 g. of starch tragacanth neutr. (1 part starch, 1 part tragacanth)

calendered at 160° C., subjected to an acid treatment with:

Sulfuric acid of 29.5° Bé.+5% formalin at 15° C. for 7 seconds, rinsed and after removal of the reserve by washing, dried. This results in a beautiful contrast effect between only mildly deformed (originally reserved) surface portions and matted fabric portions which are imparted by the preceding calendering, very particular optical characteristics and a consequently distinct appearance.

EXAMPLE XI

A fixed, bleached nylon fabric is embossed with an embossing roller at 160° C., subjected to a mild acid treatment with:

Sulfuric acid of 28° Bé. at 10° C. for 5 seconds, well rinsed and then shrunk with a mixture of 90% acetic acid at 40 percent concentration, and 10% $H_2O_2$ of 40 percent concentration, at 85° C. for 1 minute.

This causes warping of the embossed and, due to the acid treatment, matted portions so they stand out magnificently from the shrunk background with its silk luster.

EXAMPLE XII

A mixed fabric of nylon and cotton is treated with sulfuric acid of 29.5° Bé. at 15° C. for 5 seconds, whereby the nylon part of the textile material is matted a deep white whereas the optical characteristics and the appearance of the cotton fibers remain unchanged. The deformation is effected by printing with the following printing composition:

900 g. of gum arabic 1:1 (1 part gum arabic, 1 part water)
90 g. of water
10 g. of turpentine

——

1000 g.

followed by calendering at 150° C. using a smooth, unpatterned roller. After removal of the reserve by thorough washing the fabric is finished by drying.

The fabric thus treated displays a permanent, patterned tone-in-tone effect differentiated with respect to the kind of glaze which is interrupted by the unaltered cotton part in an interesting manner and which, if desired, may still be enhanced by subsequent dyeing.

While quite a number of embodiments of the invention have been disclosed, and various modes of carrying it into effect, it will be readily apparent to those skilled in the art that the invention as illustrated in the foregoing specification, is susceptible to numerous variations without departure from the spirit of the invention or sacrifice of the advantages thereof. Accordingly, the scope of the invention is to be understood as limited solely by the appended claims.

I claim:

1. A method of improving flat material containing synthetic thermoplastic material, comprising the steps of mechanically deforming said flat material at elevated temperature, and modifying the light reflection characteristics of at least part of said material by superficially swelling said material by treatment with an acid at a temperature between about −30° and about +120° C. for a period from 1 second to about 10 minutes, wherein said mechanical deformation step is performed when said flat material is in the dry state, either before or after said swelling step.

2. The method of claim 1 wherein the mechanical deformation is effected by calendering.

3. The method of claim 2 wherein the mechanical deformation step comprises calendering by contact with smooth patternless calender rollers.

4. The method of claim 2 wherein the mechanical deformation step comprises calendering by contact with smooth patternless calender rollers revolving at the same speed.

5. The method of claim 2 wherein the mechanical deformation step includes calendering by contact with smooth patternless rollers revolving at different speeds from the speed of the material, to impart a frictional high glaze finish.

6. The method of improving flat material according to claim 1 and particularly adapted for use on flat material containing polyamide fibers, comprising modifying the light reflection characteristics of at least part of said material by treatment with sulfuric acid of from about 20° to about 60° Bé. at a temperature from about −30° to about +80° C. for from about 1 second to about 2 minutes.

7. The method of improving flat material according to claim 1 and particularly adapted for use on flat material containing polyamide fibers, comprising modifying the light reflection characteristics of at least part of said material by treatment with hydrochloric acid of from about 8° to about 18° Bé. at a temperature from about −30° to about +80° C. for from about 1 second to about 2 minutes.

8. The method of improving flat material according to claim 1 and particularly adapted for use on flat material containing polyamide fibers, comprising modifying the light reflection characteristics of at least part of said material by treatment with nitric acid of from about 18° to about 30° Bé. at a temperature from about −30° to about +80° C. from about 1 second to about 2 minutes.

9. The method of improving flat material according to claim 1 and particularly adapted for use on flat material containing polyamide fibers, comprising modifying the light reflection characteristics of at least part of said material by treatment with formic acid of from about 30 to about 85 percent concentration at a temperature from about −30° to about +80° C. for from about 1 second to about 2 minutes.

10. The method of improving flat material according to claim 1 and particularly adapted for use on flat material containing polyamide fibers, comprising modifying the light reflection characteristics of at least part of said material by treatment with phosphoric acid of from about 50 to about 85 percent concentration at a temperature from about −30° to about +100° C. for from about 1 second to about 10 minutes.

11. The method of improving flat material according to claim 1 and particularly adapted for use on flat material containing polyacrylonitrile fibers, comprising modifying the light reflection characteristics of at least part of said material by treatment with sulfuric acid of from about 60° to about 66° Bé. at a temperature from about 50° to about 120° C. for from about 1 second to about 5 minutes.

12. The method of improving flat material according to claim 1 and particularly adapted for use on flat material containing polyacrylonitrile fibers, comprising modifying the light reflection characteristics of at least part of said material by treatment with nitric acid of from about 35° to about 44° Bé. at a temperature from about −20° to about +60° C. for from about 1 second to about 5 minutes.

13. The method of claim 2 wherein the mechanical deformation is effected by application in pattern form of heat insulating reserves followed by calendering, whereby to deform thermoplastically the non-reserved portions of said flat material at least substantially more than the portions at least partly reserved against heat transfer.

14. The method of claim 2 wherein the mechanical deformation is effected in varying intensity following a pattern whereby the superficial swelling treatment yields a patterned difference in the light reflection characteristics of different parts of the molded portions.

15. The method of improving flat material according to claim 1, wherein the step of modifying the light reflection characteristics precedes the mechanical deformation step.

16. The method of improving flat material according to claim 1, wherein the step of modifying the light reflection characteristics follows the mechanical deformation step.

17. The method of improving flat material according to claim 1, comprising printing thereon, at any stage of the treatment prior to superficial swelling, a printing paste reserving against the superficial swelling agent.

18. The method of improving flat material according to claim 1, comprising applying, at any stage of the improvement subsequent to the mechanical deformation, a shrinking agent adapted to shrink the synthetic thermoplastic material contained in said flat material.

References Cited in the file of this patent

UNITED STATES PATENTS

| | | |
|---|---|---|
| 2,103,018 | Ruperti | Dec. 21, 1937 |
| 2,144,676 | Dreyfus | Jan. 24, 1939 |
| 2,144,677 | Dreyfus et al. | Jan. 24, 1939 |
| 2,144,685 | Mellor et al. | Jan. 24, 1939 |
| 2,461,603 | Hunter et al. | Feb. 15, 1949 |
| 2,635,323 | Ginzel | Apr. 21, 1953 |

FOREIGN PATENTS

| | | |
|---|---|---|
| 555,575 | Great Britain | Aug. 30, 1943 |